United States Patent [19]
Mukai et al.

[11] Patent Number: 6,011,235
[45] Date of Patent: Jan. 4, 2000

[54] METHOD AND APPARATUS FOR CONTROLLING RESISTANCE WELDING

[75] Inventors: Ren Mukai; Masaaki Fujisawa, both of Chiba-ken, Japan

[73] Assignee: Miyachi Technos Corporation, Chiba-Ken, Japan

[21] Appl. No.: 08/927,397

[22] Filed: Sep. 10, 1997

[30] Foreign Application Priority Data

Sep. 11, 1996 [JP] Japan ................................. 8-262438
Oct. 24, 1996 [JP] Japan ................................. 8-299271
Oct. 24, 1996 [JP] Japan ................................. 8-299272

[51] Int. Cl.$^7$ .................................................. B23K 11/20
[52] U.S. Cl. ......................... 219/110; 219/86.9; 219/91.2
[58] Field of Search ................................. 219/110, 108, 219/114, 117.1, 83, 86.9, 91.2

[56] References Cited

U.S. PATENT DOCUMENTS

| | | | |
|---|---|---|---|
| 2,137,909 | 11/1938 | Hagedorn | 219/86.9 |
| 3,921,058 | 11/1975 | Tanaka et al. | 219/108 |
| 4,554,430 | 11/1985 | Belamaric | 219/110 |
| 4,634,830 | 1/1987 | Furudate | 219/110 |
| 4,870,227 | 9/1989 | Saen et al. | 219/91.2 |
| 5,237,147 | 8/1993 | Pazzaglia | 219/108 |
| 5,489,757 | 2/1996 | Schuermann et al. | 219/110 |
| 5,607,604 | 3/1997 | Ishikawa | 219/110 |

*Primary Examiner*—Clifford C. Shaw
*Attorney, Agent, or Firm*—Wenderoth, Lind & Ponack, L.L.P.

[57] ABSTRACT

An apparatus for controlling resistance welding defines a weld time for series welding as a plurality of (e.g., two) weld periods. In one embodiment, a control successively switches a bidirectional switch in a first polarity during the first weld period so that welding current flows through workpieces of different metals in one direction by passing through a series of welding points of the workpieces. In the second weld period, the control successively switches the bidirectional switch in the reversed polarity so that welding current flows through the workpieces in the other direction so as to compensate for Pertier effect on the welding points. A polarity changing technique is used to minimize welding energy loss in shifting weld periods for better weld quality. In another embodiment, thyristors are controlled such that they are fired in the second half cycle of the supply voltage at an angle smaller than the firing angle in the first half cycle.

9 Claims, 11 Drawing Sheets

($\phi_B = \phi_A - \zeta_C$)

METHOD AND APPARATUS FOR CONTROLLING RESISTANCE WELDING

BACKGROUND OF THE INVENTION

This invention relates to a method and apparatus for controlling resistance welding which operates switchings at a high frequency and supplies an alternating current at a relatively low frequency to workpieces for resistance welding.

In recent years, a resistance welding machine using an inverter in the electric power supply has been widely employed. FIG. 15 shows an arrangement of a typical prior art inverter resistance welding machine. The inverter circuit 100 includes switching elements. In response to control pulses CP from the inverter control 102, the inverter circuit 100 switches the supplied direct voltage E into pulsed alternating current $I_1$ (primary current) having a high frequency. The pulsed alternating current $I_1$ from the inverter circuit 100 is supplied to the primary coil of the the welding transformer 104. As a result, the secondary coil of the transformer supplies a secondary pulsed alternating current which is proportional to the primary pulsed alternating current $I_1$. The secondary pulses are converted into direct current $I_2$ by means of the rectifier circuit 106 having a pair of diodes 106a and 106b. The direct secondary current or welding current $I_2$ flows through workpieces $W_1$ and $W_2$ via welding electrodes 108 and 110.

Such an inverter resistance welding machine has also been used for simultaneous two point resistance welding (series welding) of workpieces, typically those of small metal for electronic components.

FIG. 16 illustrates a series welding. In FIG. 16, a pair of welding electrodes 108 and 110 make and keep pressure contact with workpieces $W_1$ and $W_2$ at spaced positions on one side of the workpieces by a welding force from a pressurizing system (not shown). During a weld time, a direct welding current $I_2$ flows along a dotted line through a first welding electrode 108, a first workpiece $W_1$, a first welding point Pa, a second workpiece $W_2$, a second welding point Pb, the first workpiece $W_1$ and a second welding electrode 110 in this order. The direct current flow causes metals at first and second welding points Pa and Pb of the workpiece $W_1$ and $W_2$ on the butt surface thereof to be melted by Joule heat. After the weld time, the welding points are solidified for metallurgically joining the workpieces.

The series welding using such a prior art inverter resistance welding machine has the problem that nuggets Na and Nb (deposit of fused metal) at welding points Pa and Pb are formed in uneven size due to Peltier effect. According to Peltier effect, a contact point between different metals, through which an electric current flows, not only undergoes a generation of Joule heat but also experiences a heat generation or absorption depending on the direction of the current.

In the series welding, the direction of the welding current $I_2$ at the welding point Pa (contact point) between the workpieces (different metals) $W_1$ and $W_2$ is opposite to that at the second welding point Pb. Specifically, as shown in FIG. 16, the welding current $I_2$ flows from the workpiece $W_1$ to the workpiece $W_2$ at the first welding point Pa whereas at the second welding point Pb the welding current $I_2$ flows from the workpiece $W_2$ to the workpiece $W_1$.

Since the welding current $I_2$ direction at the welding point Pa is opposite to that at the welding point Pb, one of the welding points, say, the first one Pa experiences a heat absorption of Peltier effect whereas the other, or the second welding point Pb experiences a heat generation of Peltier effect (though the same Joule heat may generate at these welding points Pa and Pb. As a result, the nugget Na at the first welding point Pa is formed in a relatively small size whereas the nugget Nb at the second welding point Pb is formed in a relatively large size, as shown in FIG. 16. Uneven size of the nugget Na and Nb means variations in joint strength at welding points and poor weld quality since the strength of the resistance welding is proportional to the nugget size.

SUMMARY OF THE INVENTION

With the problems of the prior art in mind, it is an object of the invention to provide a method and apparatus for controlling resistance welding which can simultaneously join workpieces at a plurality of welding points (as in the case of series welding) with uniform welding strength and in a short time.

Another object of the invention is to provide a method and apparatus for controlling resistance welding which can minimize a rest time required in changing over weld periods of opposite polarity to thereby improve weld quality with the switching elements protected.

In accordance with an aspect of the invention, there is provided a method for controlling resistance welding in which workpieces are kept in pressure contact with first and second welding electrodes at spaced contact positions and a welding current flows through the workpieces via the first and second welding electrodes to thereby weld the workpieces at first and second points corresponding to the contact positions of the first and second welding electrodes, respectively, the method comprising:

converting an alternating current having a commercial frequency to a direct current by a rectifier circuit, supplying the direct current to a bidirectional switching apparatus supplying the output of the bidirectional switching apparatus to a primary coil of a welding transformer, and applying a voltage induced in a secondary coil of the welding transformer to the first and second welding electrodes so that the welding current flows through the workpieces; and successively switching said switching apparatus in a first polarity at a high frequency during a first half of a weld time and successively switching the switching apparatus in a second polarity at a high frequency during a second half of the weld time.

With this arrangement, at the end of the complete weld time, the nuggets at the first and second weld points have grown in essentially the same size. Therefore, the present method for controlling resistance welding can simultaneously join a plurality of points of workpieces (as in the case of series welding) with uniform welding strength and in a short weld time.

In accordance with another aspect of the invention, there is provided an apparatus for controlling resistance welding which comprises:

a rectifier circuit for converting an alternating current having a commercial frequency to a direct current;

a bidirectional switching circuit for converting the direct current from the rectifier circuit to pulses having a high frequency;

a welding transformer having a primary coil for receiving the output from the switching circuit and a secondary coil for outputting a pulsed voltages at a high frequency;

a pair of welding electrodes connected across the secondary coil of the welding transformer for making pressure contact with workpieces at spaced positions;

a switching controller for defining a weld time of a resistance welding operation as a plurality of weld periods, for successively switching the switching circuit in a first polarity at a predetermined high frequency during an odd numbered weld period in the plurality of weld periods and for successively switching the switching circuit in a second polarity at the predetermined high frequency during an even numbered weld period in the plurality of weld periods;

a current detector for detecting a primary or secondary current of the welding transformer to thereby provide a detected current signal;

a current monitor for monitoring the current based on the detected current signal from the current detector immediately after each weld period to thereby detect a timing when the current has reached a predetermined monitor value; and a weld period starter for starting the next weld period in response to the timing detected by the current monitor.

With this arrangement, immediately after each weld period in a plurality of weld periods in which the polarity alternately changes from one weld period to another, a primary or secondary trailing current of the welding transformer is monitored to detect a timing when the current has reached a predetermined monitor value. In response to the timing, the next weld period starts. In doing so, a rest time required for switching one weld period to another can be minimized. This arrangement not only protects the switching elements but also improves weld quality since the heat loss in the rest time is minimized.

BRIEF DESCRIPTION OF THE DRAWINGS

The above and other objects and advantages of the invention will become more apparent from the following description taken in conjunction with the accompanying drawings in which.

DETAIL DESCRIPTION OF PREFERRED EMBODIMENTS

Figure 1:
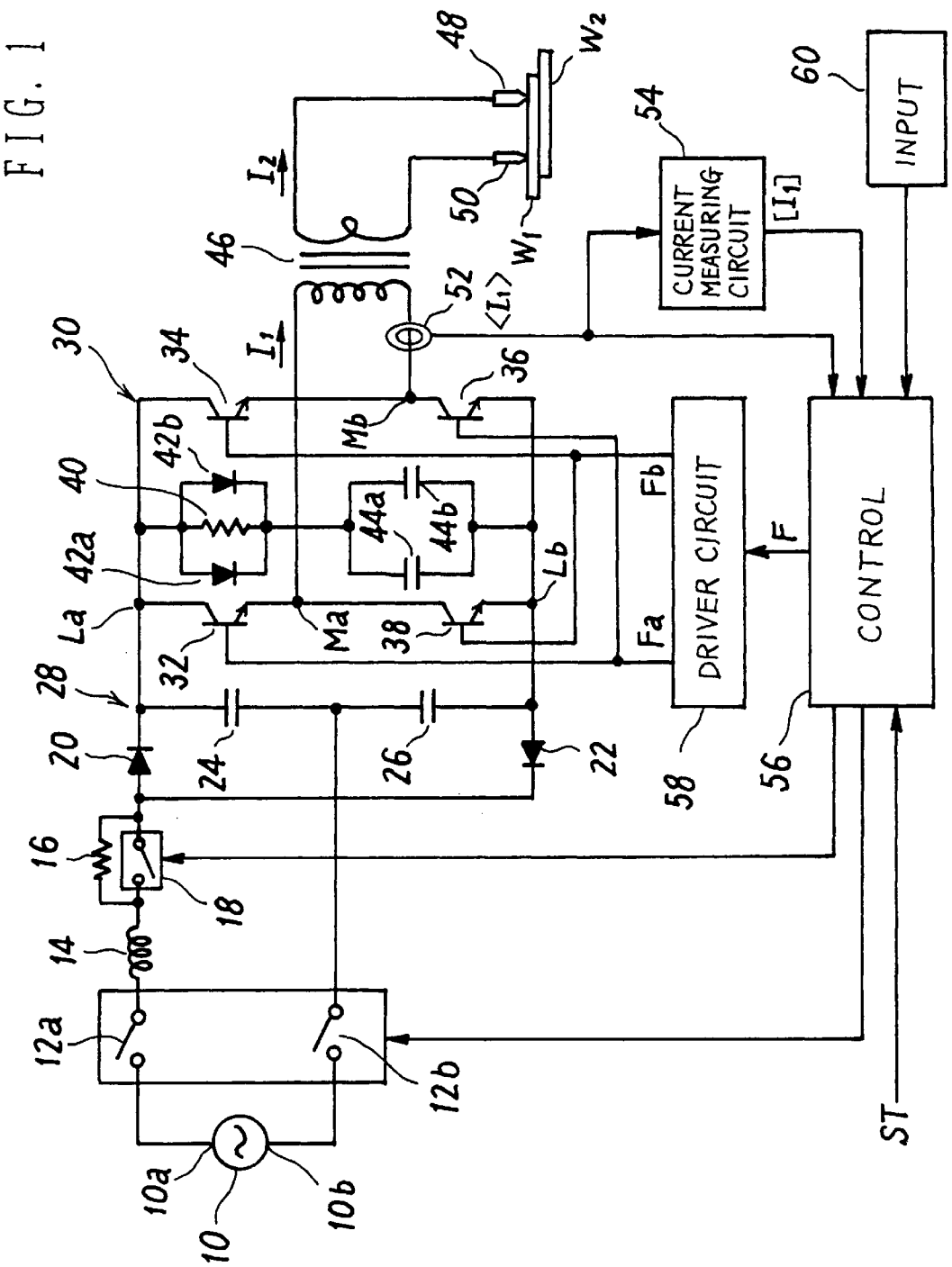
FIG. 1 is a diagram showing an arrangement of one embodiment of a resistance welding machine for series welding in accordance with the invention.

FIG. 1 shows an arrangement of one embodiment of a resistance welding machine for series welding in accordance with the invention. The resistance welding apparatus uses a single-phase alternating current power supply 10 having a commercial frequency (50 Hz or 60 Hz) and voltage (e.g., 100 V). In accordance with the invention, a bidirectional switching circuit 30 is provided in the resistance welding apparatus. The bidirectional switching circuit 30 comprises four transistor switching elements 32, 34, 36 and 38, each implemented by GTR (giant transistor), or IGBT (insulated gate bipolar transistor).

In these four switching elements 32, 34, 36, 38, the first pair of switching elements 32 and 36 for positive polarity is simultaniously on-off controlled or switched at a predetermined high frequency (e.g., 8 kHz) by a first switching control signal Fa from a driver circuit 58 whereas the second pair of the switching elements 34 and 38 for negative polarity is simultaniously on-off controlled at the predetermined high frequency (8 kHz) by a second switching control signal Fb from the driver circuit 58.

The input terminals La and Lb of the switching circuit 30 are connected to output terminals of a rectifier circuit 28 to be described. The output terminals Ma and Mb of the switching circuit 30 are connected across a primary coil of a welding transformer 46. A pair of welding electrodes 48 and 50 are directly (not through any rectifier circuit) connected across a secondary coil of the welding transformer 46. During the weld time, the welding electrodes 48 and 50 make and keep pressure contact with workpieces $W_1$ and $W_2$ of different metals at spaced contact positions by a welding force from a pressurizing system (not shown).

The rectifier circuit 28 mainly comprises a pair of diodes 20 and 22 and a pair of capacitors 24 and 26. An anode of the diode 20 and a cathodes of the diode 22 are connected to one end 10a of the alternating current power supply 10. A cathode of the diode 20 is connected to one end of the capacitor 24 and one input terminal La of the switching circuit 30. The other end of the capacitor 24 is connected to one end of the capacitor 26 and the other end 10b of the alternating current power supply 10. The other end of the capacitor 26 is connected to the anode of the diode 22 and to the other input terminal Lb of the switching circuit 30.

The diode 20 in the full-wave rectifier circuit 28 half-wave rectifies the supplied commercial alternating voltage from the alternating current power supply 10 for each positive half cycle thereof to charge the capacitor 24 whereas the diode 22 half-wave rectifies the supplied alternating voltage from the alternating current power supply 10 for each negative half cycle thereof to charge the capacitor 26. The capacitors 24 and 26 are connected in series in such a manner that the charged voltage across the capacitor 24 is added to the charged voltage across the capacitor 26 to provide the output direct voltage of the rectfire circuit 28. The output voltage of the rectfier circuit 28 is applied to the input terminals La and Lb of the switching circuit 30.

A main power switch 12a, a choke coil 14 and a current-limiting resistor 16 are serially connected between one end 10a of the alternating current power supply 10, and anode of the diode 20 and cathode of the diode 22. A bypass switch 18 is connected in parallel with the current limiting resistor 16. A main switch 12b is interposed between the other end 10b of the alternating current power supply 10 and the junction between the capacitor 24 and 26. The current-limiting resistor 16 operates for the initial charging of the capacitors 24 and 26 upon the closing of the main switches 12a and 12b. It is bypassed after the initial charging.

In this manner, the rectifier circuit 28 converts the commercial alternating voltage of 100 V from the single-phase alternating current power supply 10 to a step-up direct voltage of about 280 V which is charged in the capacitors 24 and 26.

The switching circuit 30 further comprises a switching noise reduction circuit connected across the input terminals La and Lb. The switching noise reduction circuit includes a resistor 40, diodes 42a and 42b and capacitors 44a and 44b connected as shown.

A current sensor 52 in the form of a current transformer, for example, is interposed in the circuit between the output terminals of switching circuit 30 and the primary coil of the welding transformer 46. During the welding operation, the current sensor 52 generates a detected current signal indicative of an instantaneous value of the primary current $I_1$. The detected current signal <$I_1$> from the current sensor 52 is supplied to a control 56 and a current measuring circuit 54.

The current measuring circuit 54 determines an effective or average value of the primary current $I_1$ as measured current value [$I_1$] for each switching cycle from the detected current signal <$I_1$> from the current sensor 52. The measured current value [$I_1$] is supplied to the control 56.

The control 56 comprises a microcomputer which includes a CPU, ROM (program memory), RAM (data memory), clock circuit, interface circuit, etc. In the present embodiment, the control 56 provides feedback constant-current control. For the constant-current control, the control 56 compares the measured current value [$I_1$] from the current measuring circuit 54 with a preselected current value <Is> stored in memory to obtain an error therebetween. From the error, the control 56 determines the width of an output pulse of the switching circuit for the next switching cycle and supplies the driver circuit 58 with a switching control signal F in the form of pulse-width modulated (PWM) signal specifying the output pulse of the switching circuit.

The control 56 also controls the main switches 12a and 12b and bypass switch 18. The main switches 12a and 12b may, however, be manually operated. An input unit 60 comprises a pointing device, such as keyboard or mouse to enter and set data. Main weld condition data to be set in the embodiment include primary or secondary (welding) current $I_1$, $I_2$, entire weld time, first half of weld time (first weld period) and second half of weld time (second weld period). The control 56 is also connected to other peripheral devices, such as display device and printer (not shown).

A basic operation of the resistance welding machine of the present embodiment is now described by reference to FIGS. 2 and 3.

To start a welding operation, the control 56 closes the main switches 12a and 12b to initially charge the capacitors 24 and 26 in the rectifier circuit 28 to a predetermined voltage (e.g., 280 V). For the initial charging, the control 56 places the bypass switch 18 in off position, thus allowing a charging current to pass through the current-limiting resistor 16.

After the initial charging of the capacitors 24 and 26, an external device (not shown), such as a welding robot, supplies a start signal ST. Then, the control 56 starts the welding operation. The start signal ST may not only indicate start of welding operation but also specify condition or schedule number of the welding operation.

For series welding of workpieces, such as those W1 and W2 shown in FIG. 3, the control 56 successively switches only the first pair (positive polarity pair) of the switching element 32 and 36 through a PWM control during the first half Ta of the weld time whereas during the second half Tb of the weld time, it successively switches only the second or negative polarity pair of switching elements 34 and 38 through a PWM control.

Figure 2:
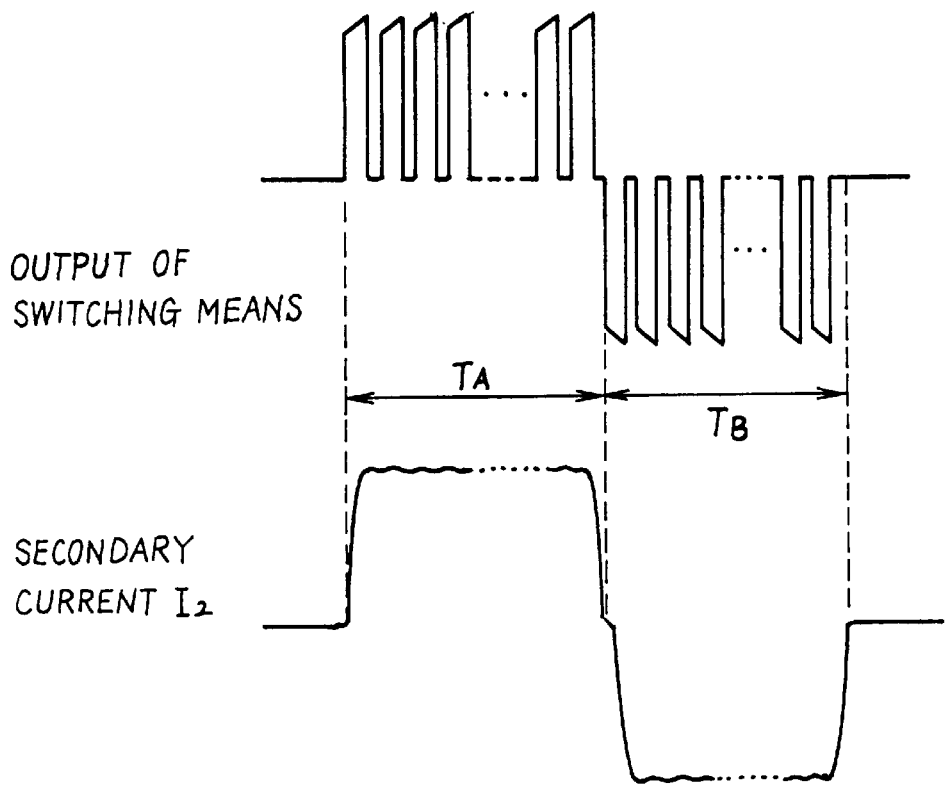
FIG. 2 is a waveform diagram showing a basic welding scheme of the resistance welding machine of the embodiment.
Figure 3A:
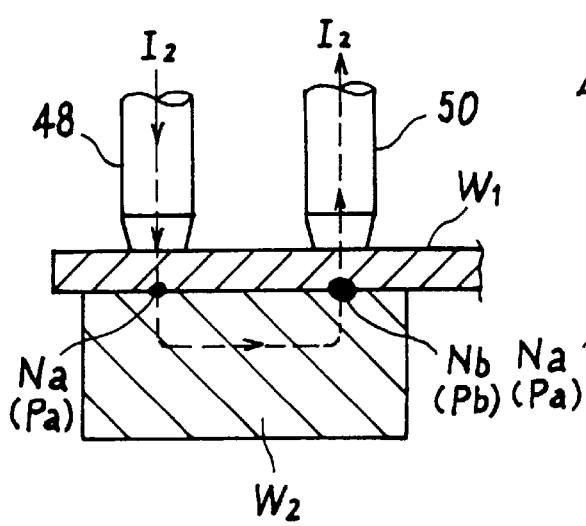
FIGS. 3A and 3B illustrate partially sectional views of workpieces showing an operation of the resistance welding machine of the embodiment.

As a result, in the first half Ta of the weld time, the switching means 30 supplies output voltage pulses in positive polarity to the primary coil of welding transformer 46 so that a positive welding current $I_2$ having a generally trapezoidal shape flows in the secondary circuit, as shown in FIG. 2. As shown in FIG. 3A, the welding current $I_2$ flows in the path of the first welding electrodes 48, the first workpiece $W_1$, the first welding point Pa, the second workpiece $W_2$, second welding point Pb, first workpiece $W_1$, second welding electrodes 50 in this order. Specifically, at the first welding point Pa, the welding current $I_2$ flows from the first workpiece $W_1$ to the second workpiece $W_2$ whereas at the second welding point Pb, the welding current $I_2$ flows back to the first workpiece $W_1$ from the second workpiece $W_2$. Thus, the first welding point Pa may undergo a heat absorption of Peltier effect whereas second welding point Pb may undergo a heat generation of Peltier effect. Therefore, in the first half Ta of the weld time, a nugget Nb at the second weld point Pb grows larger than a nugget Na at the first welding point Pa.

Figure 3B:
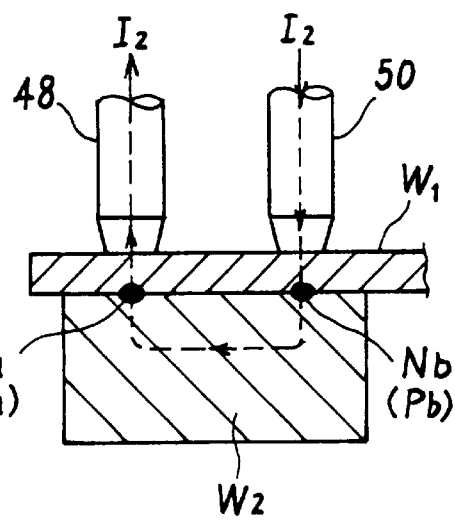
Figure 4:
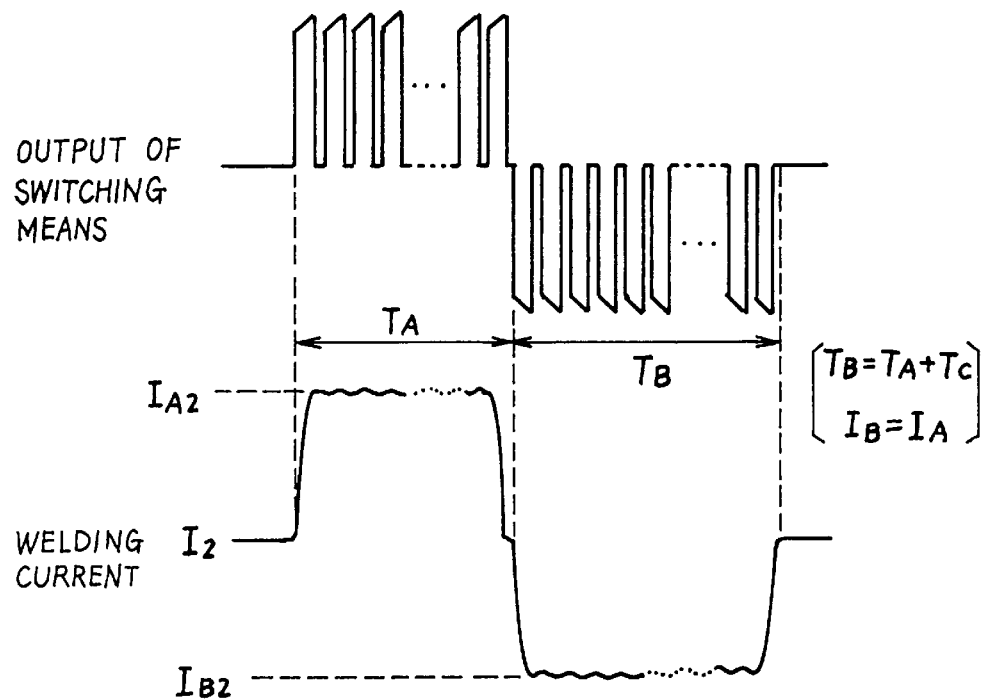
FIG. 4 is a waveform diagram showing a preferred welding scheme of the resistance welding machine of the embodiment.

During the second half Tb of the weld time, the switching circuit 30 supplies output voltage pulses in negative polarity to the primary coil of the welding transformer 46 so that a negative welding current $I_2$ having a generally trapezoidal shape flows in the secondary circuit. At this time, the welding current $I_2$ flows in the reversed path of the second welding electrode 50, the first workpiece $W_1$, second welding point Pb, second workpiece $W_2$, first welding point Pa, first workpiece $W_1$ and first welding electrodes 48 in this order, as shown in FIG. 3B. Now, at the first welding point Pa, the welding current $I_2$ flows from the second workpiece $W_2$ to the first workpiece $W_1$ whereas at the second welding point Pb, the welding current $I_2$ flows from the first workpiece $W_1$ to the second workpiece. Thus, the first welding point Pa undergoes a heat generation of Peltier effect whereas the second welding point Pb undergoes a heat absorption of Peltier effect. Therefore, in the second half Tb of the weld time, the nugget Na at the first welding point Pa grows larger than the nugget Nb at the second welding point Pb.

As a result, at the end of the second half Tb of the weld time, or the end of the entire weld time, the nugget Na at the first welding point Pa and the nugget Nb at the second welding point Pb have grown to essentially the same size. Thus, the first and the second welding points Pa and Pb provide a uniform welding strength.

Each duration of the first and second halves of Ta and Tb may be minimized to, say, 5 ms. Since the welding current $I_2$ is controlled to have a trapezoidal waveform, heat efficiency of workpieces $W_1$ and $W_2$ is relatively high so that sufficiently large nugget or satisfactory welding strength can be obtained with a weld time of a relatively short duration of about 10 ms. In the case of a single-phase alternating current system, even a single cycle takes 20 ms (for 50 Hz) and the heat efficiency is relatively low, so that two or three cycles (40–60 ms) may be needed for the weld time.

As stated, in the second half Tb of the weld time in which a reversed Peltier effect is produced, the nugget Na at the first welding point Pa grows at a higher growth rate than that of the nugget Nb at the second welding point Pb, so that the size of the nugget Na approaches the size of the nugget Nb. It is noted, however, that the nugget formed in the first half Ta of the weld time has reduced the resistance of the current path and the heat efficiency, so that the growth rates of nuggets Na and Nb in the second half Tb are lower than those in the first half Ta. Thus, the growth rate difference (Na>Nb) between the nuggets Na and Nb in the second half Tb of the weld time will become smaller than that (Na<Nb) in the first half Ta. For this reason, at the end of the second half Tb of the weld time the size of the nugget Na may not reach that of the nugget Nb.

This problem can be overcome by extending the second half Tb of weld time to be longer than the first half Ta by some suitable time Tc. In the extension Tc of the second half, the size of nugget Na may reach that of the nugget Nb. The extension time Tc that meets the reaching condition depends on the welding conditions including material and thickness of workpieces $W_1$ and $W_2$, duration of the first half Ta, preselected current value Is, etc., and may be empirically determined by, for example, a welding test.

Figure 5:
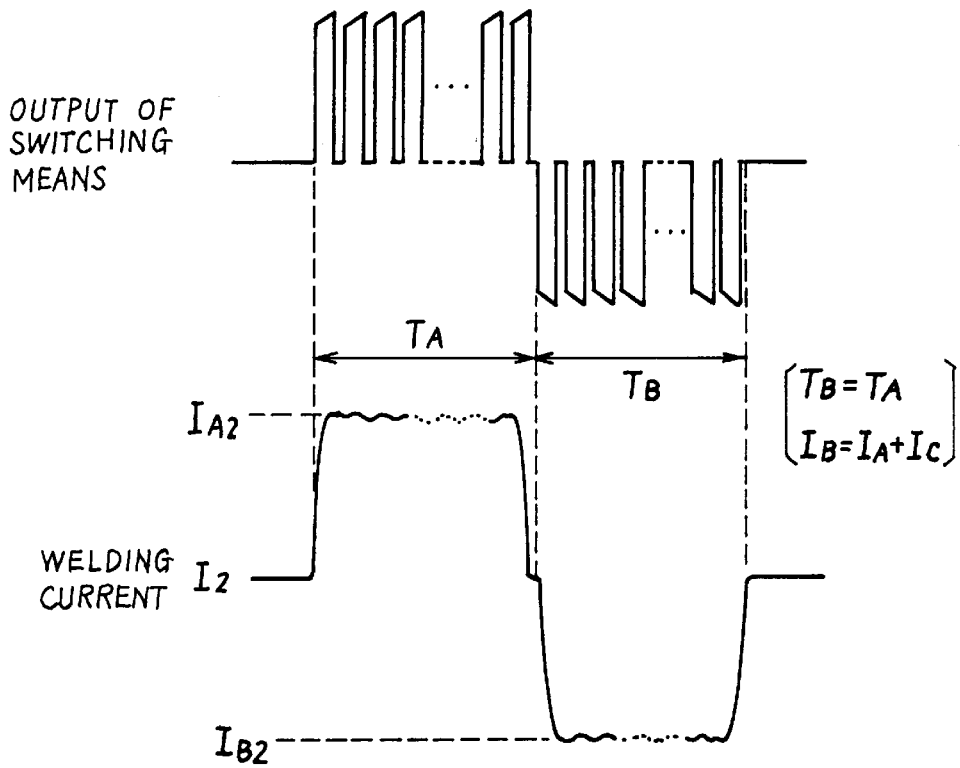
FIG. 5 is a waveform diagram showing another preferred welding scheme of the resistance welding machine of the embodiment.

In the alternative, a primary or secondary preselected current value Ib1 or Ib2 for the constant-current control in the second half Tb of the weld time may be chosen to be greater than a primary or secondary preselected current value Ia1 or Ia2 for the constant-current control in the first half Ta by a predetermined value Ic, as shown in FIG. 5.

In the second half Tb of the weld time, due to the reversed Pertier effect, the nugget Na at the first welding point Pa grows at a faster growth rate than that of the nugget Nb at the second welding point Pb, so that the size of nugget Na approaches that of the nugget Nb. Since the welding current Ib2 in the second half is controlled greater than the welding current Ia2 in the first half Ta, the approaching rate of the nugget Na size to the nugget Nb size is increased, so that at the end of the second half Tb having the same duration as that of the first half Ta the size of the nugget Na may have reached that of the nugget Nb. The additional current value Ic meeting the reaching condition depends on the welding conditions including materials and thickness of workpieces $W_1$ and $W_2$, duration of the first half Ta, preselected current value Ia etc., and may empirically be determined by a welding test.

The current magnitude in positive polarity may be different to that in negative polarity, depending on Peltier effect or other conditions. In accordance with the present resistance welding machine, however, a desired constant-current control can be achieved stably since it controls the current so as to flow in a predetermined direction or polarity in each half Ta, Tb of the weld time through a PWM control.

In the present resistance welding machine, switching circuit 30 operates switchings at a high frequency of 8 kHz, for example, whereas the current whose frequency is determined by each half period Ta, Tb of the weld time flows in the welding transformer 46. Thus, the welding transformer 46 may be implemented by an ordinary single phase one for commercial frequency rather than a high frequency type.

Figure 6:
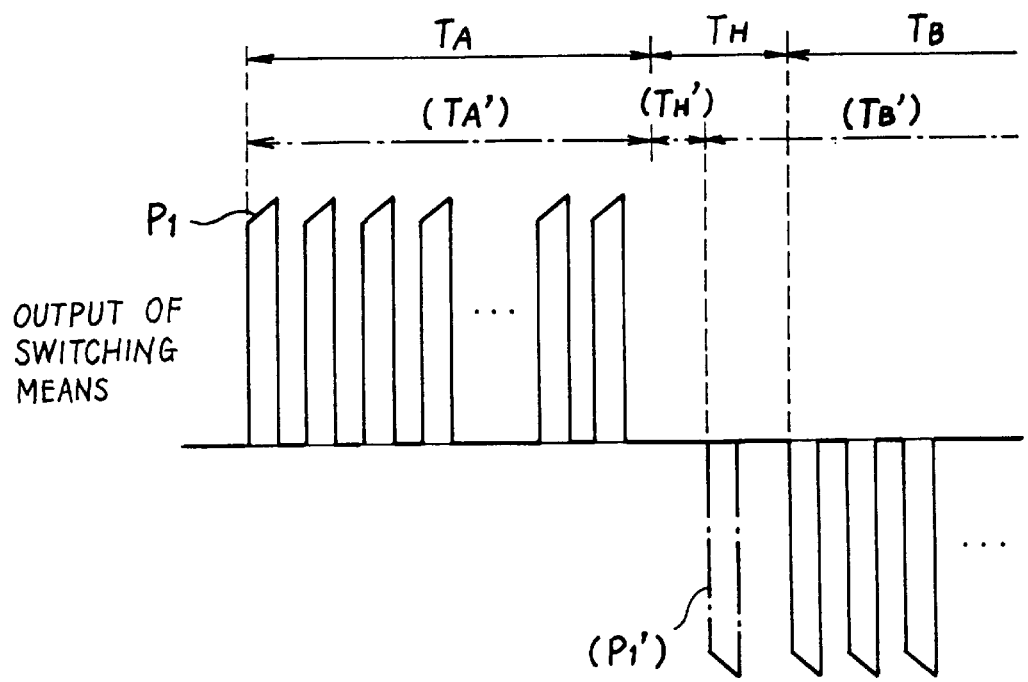
FIGS. 6A and 6B illustrate waveform diagrams showing a problem in switching one weld period to another in the resistance welding apparatus of the embodiment.
Figure 6:
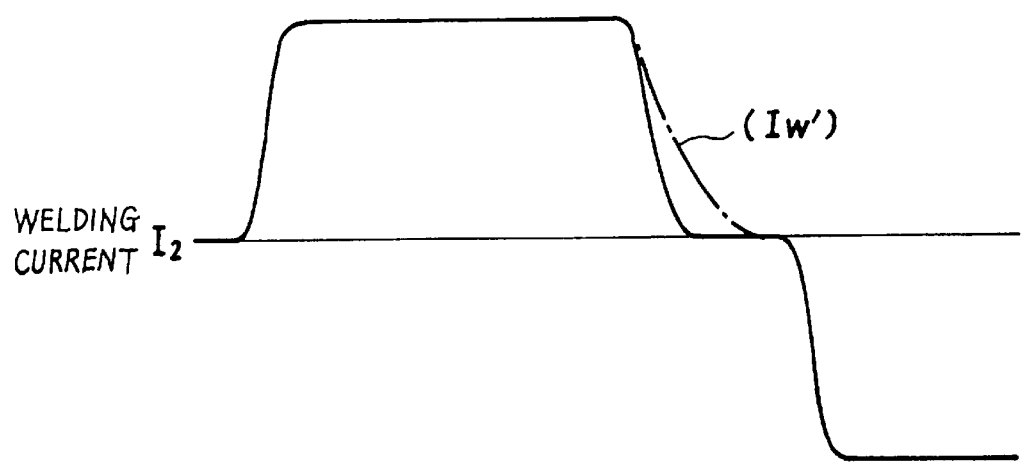

For switching the polarity of the switching circuit 30, a rest time Th is required between the end of the first half Ta of the weld time and the start of the second half Tb, as shown in FIGS. 6A and 6B. At the end of the first half Ta, the switching operation of the switching circuit 30 stops. However, the secondary welding current $I_2$ trails and takes some time to completely fall down. In the primary circuit, primary current $I_1$ proportional to the secondary welding current flows either. If the next weld period in reversed polarity starts (if the switching elements for the reversed polarity are turned on as shown in a broken line $P_1'$ in FIG. 6A in the fall time of the current as shown in a broken line Iw' in FIG. 6B, a voltage is directly applied to those switching elements which have been conductive due to the welding current transition of the previous weld period, thus destroying these switching elements instantly.

Figure 7:
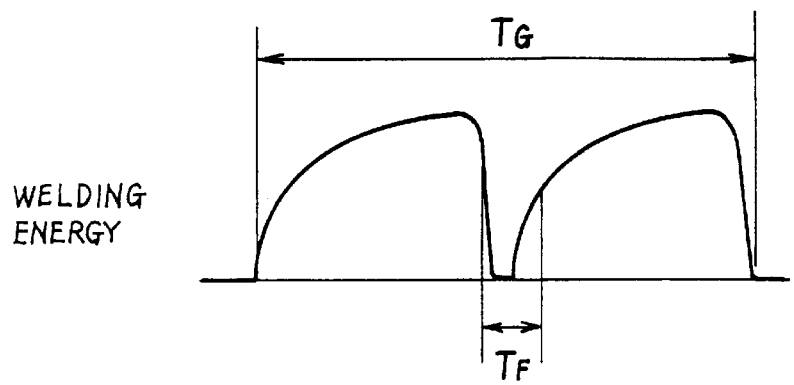
FIG. 7 is a schematic diagram of welding energy supplied to workpieces during weld time in the resistance welding machine of the embodiment.

The fall time of the current at the end of the weld period depends on the load (in particular workpieces) variation. To safely protect the switching elements, a sufficient margin may be given to the rest time Th. A longer rest time Th, however, correspondingly extends the reduced energy time Tf in the time chart of the welding energy supplied to workpieces, as shown in FIG. 7, thus reducing heat efficiency of resistance welding and degrading weld quality. In particular, for smaller workpieces for electronic components, the weld time must be minimized since such workpieces are easily damaged. The reduction of heat efficiency largely affects weld quality.

To overcome the above problem, the present welding resistance machine employs an advantageous polarity changeover method. In accordance with the method, immediately after the first half Ta of weld time, the primary current $I_1$ is monitored to detect a timing when the current $I_1$ falls down to a predetermined monitor value. The second half period Tb starts in response to the timing. With the present polarity changeover method, the rest time required for switching or shifting weld periods can be minimized as shortest as possible. Switching elements are safely protected. The reduction of heat efficiency in the rest period can be minimized so that weld quality can be improved.

Figure 9:
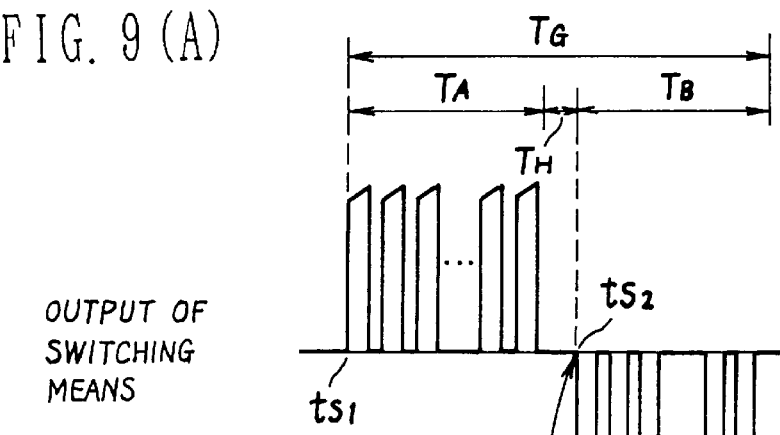
FIGS. 9A and 9B illustrate waveform diagrams showing a timing for starting a new weld period in the resistance welding machine of the embodiment.
Figure 9:
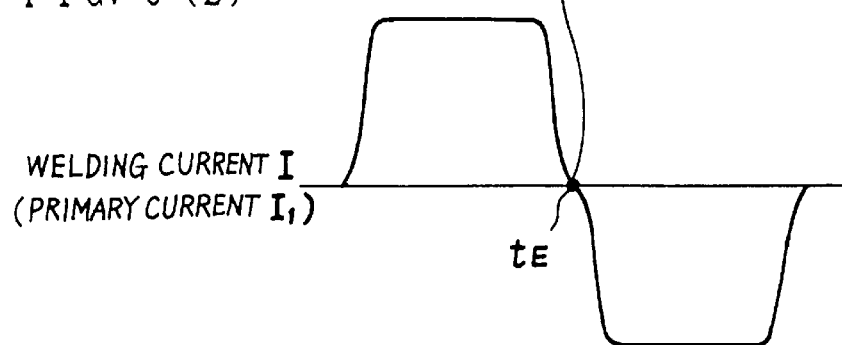
Figure 8:
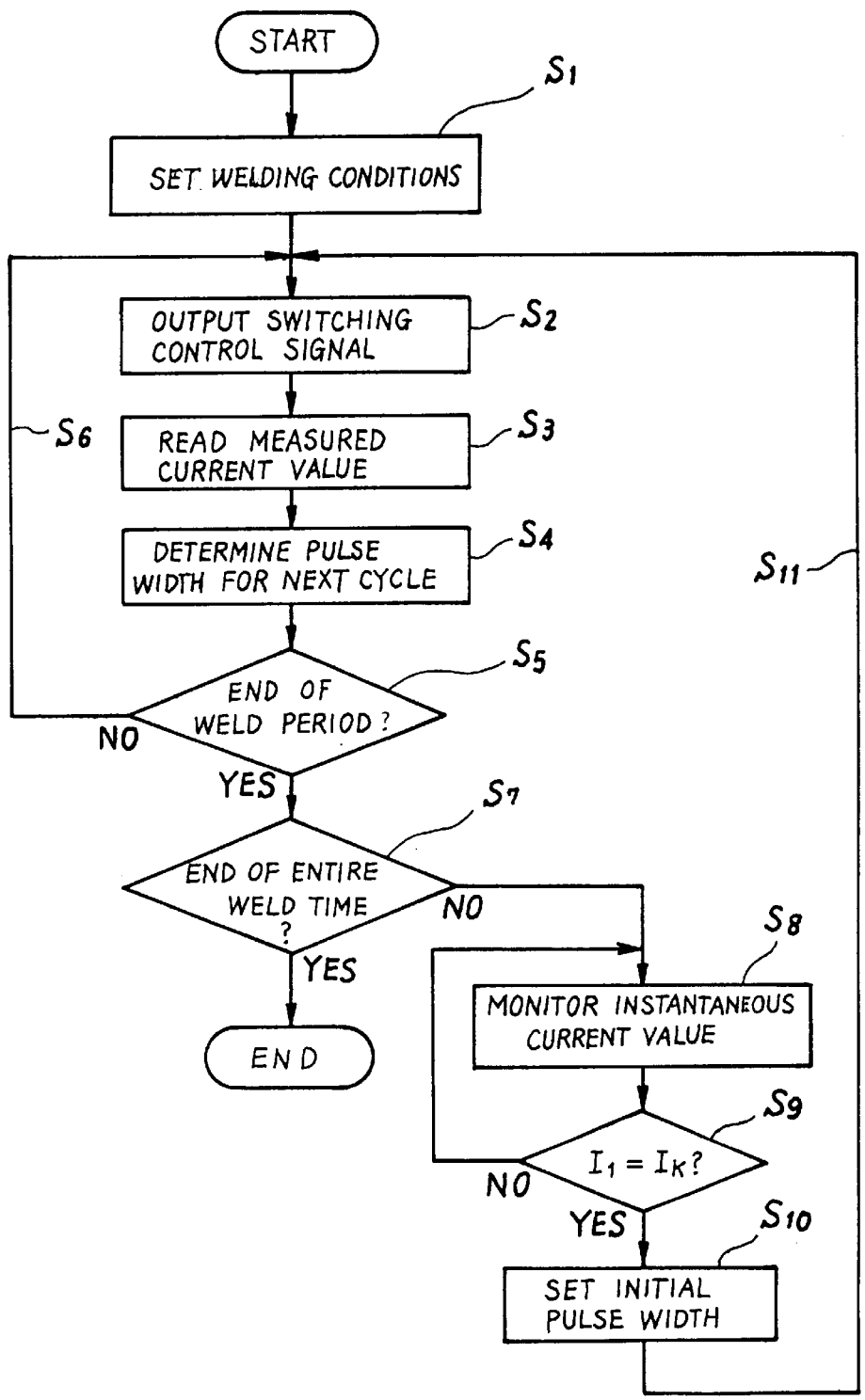
FIG. 8 is a flowchart showing an operation of the control in the resistance welding apparatus of the embodiment for resistance welding.

FIG. 8 is a flowchart showing an operation of the control 56 for performing the polarity changeover and PWM control. FIG. 9 shows a timing when the next weld period starts in accordance with the present polarity changeover method. For the present polarity changeover method, a current monitor value Ik, initial pulse width D0, etc., are preset in the control 56. In the present example, the "current monitor value Ik" refers to a welding condition in place of the "rest period Th" and will normally be set to zero ampere or nearby. The "initial pulse width D0" specifies a pulse width of an initial pulse (switching on time) in each weld period Ta.

In FIG. 8, in response to the start signal St from an external device such as a welding robot, the control 56 reads from memory preselected data including preselected value Is of the primary current, current monitor value Ik, initial pulse width D0 etc., for the present welding operation and sets them in a predetermined storage location, register, timer or counter to start the welding operation (step $S_1$).

Next, the control 56 supplies a first switching control signal Fa having the initial pulse width D0 to the first and positive polarity pair of the switching elements 32 and 36 in the switching circuit 30 through the driver circuit 58, thus turning on the switching element 32 and 36 (step S2). The first weld period Ta in positive polarity starts at the time point ts1.

In the first switching cycle, the welding current Iw and primary current $I_1$ flow in the secondary and primary circuits of the welding transformer 46, respectively. Then, the current sensor 52 outputs a detected current signal <$I_1$> representative of an instantaneous value of primary current $I_1$. The current measuring circuit 54 outputs a measured current value [$I_1$] (effective or average value) of the primary current [$I_1$] in the switching cycle.

The control 56 reads the measured current value [$I_1$] from the current measuring circuit 54 (step $S_3$), compares the measured current value [$I_1$] with the preselected current value [Is] to derive an error of the measured current value [$I_1$] and determines from the error a pulse width (switching on time) $D_1$ for the next switching cycle (step $S_4$).

In the second switching cycle, the control 56 supplies a first switching control signal Fa having the pulse width $D_1$ to the first or positive pair of switching elements 32 and 36 in the switching circuit 30, thus turning on these switching elements 32 and 36 (steps $S_6$, $S_2$).

In this manner, during the first weld period Ta1, only the first pair of switching elements 32 and 36 (for positive polarity) in the switching circuit 30 are successively switched at a high frequency (8 kHz) on a feedback pulse width control basis (steps $S_2$–$S_6$). In the meantime, the second pair of switching elements 34 and 38 (for negative polarity) are kept in off state. As a result, in the secondary circuit of the welding transformer 46, constant-current controlled welding current Iw having the magnitude corresponding to the preselected current value [Is] flows in the direction of positive polarity.

At the end of the first period Ta, or the first half Ta of the weld time, the control 56 no longer supplies the first switching control signal Fa to the first pair of switching elements 32 and 36 for positive polarity or no longer reads the measured current value [$I_1$] from the current measure circuit 54. Instead, the control 56 reads the detected current signal <$I_1$> from the current sensor 52 to thereby monitor an instantaneous value of the primary current $I_1$ or welding current Iw (step $S_8$). The monitoring period corresponds to the rest time Th in which the current $I_1$ (Iw) falls at a time constant determined by the load impedance at the time.

Upon detecting a timing te when the current $1_1$ (Iw) has reached the current monitor value [Ik], the control 56 terminates the monitor period or rest period Th and starts the second weld period or second half Tb of the weld time in negative polarity. Specifically, the control 56 sets the initial pulse width D0 (step $S_{10}$), and supplies a second switching control signal Fb having the initial pulse D0 to the second pair of switching elements 34 and 38 for negative polarity in the switching means 30 via the driver circuit 58 at a time point ts2 immediately after the detected timing te, thus turning on the switching elements 34 and 38 (steps $S_{11}$, $S_2$).

During the second weld period Tb, only the second pair of switching elements 34 and 38 for negative polarity in the switching means 30 are successively switched at a high frequency (8 kHz) on a feedback pulse width control basis (steps $S_2$–$S_6$). In the meantime, the first pair of switching elements 32 and 36 for positive polarity are kept in off states. As a result, in the secondary circuit of the welding transformer, a constant-current controlled welding current $I_w$ having the magnitude corresponding to the preselected current value [$I_s$] flows in the direction of negative polarity.

In the present example, the entire weld time Tg has ended at the end of the second weld period or the second half Tb of the weld time, so that the control 56 terminates the welding operation (step $S_7$). In accordance with the present polarity changeover method, the duration of the rest period Th between the end of the first half Ta of weld time and the start of the second half Tb is not constant but depends on the current trailing characteristic at that time. The method starts the second weld period Tb as soon as possible and minimizes the total weld time Tg while protecting the switching elements 32–38 from short-circuiting damages. Thus the method minimizes the rest period Th as shortest as required. The present polarity changeover method minimizes the temporal reduction of welding energy or Joule heat at welding points of workpieces $W_1$ and $W_2$ in changeover or shifting weld periods.

In the illustrated embodiment, nuggets Na and Nb at the welding points Pa and Pb are controlled so as to grow to essentially the same size to provide a uniform welding strength. The invention, however, can also be applied to series welding, such as the one shown in FIG. 10 by adjusting each duration of the first half Ta and second half Tb of the weld time.

Figure 10:
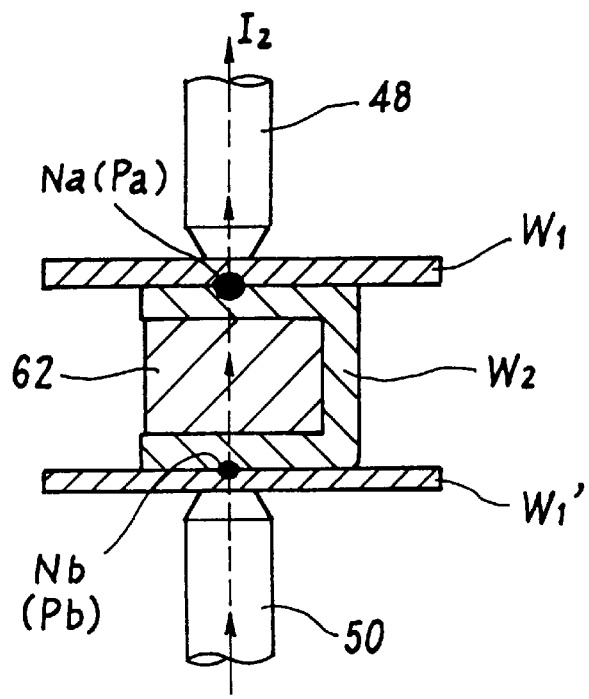
FIG. 10 is a partially sectional view of workpieces showing another operation of the resistance welding machine of the embodiment.

In FIG. 10, a workpiece $W_2$ having a U-shaped cross section is welded together, on the opposite sides thereof, with a relatively thick workpiece plate $W_1$ and a relatively thin workpiece plate $W_1'$ of the same material as the workpiece $W_1$ material, respectively. For balancing the welding strength, it is preferred to make a nugget Na at the welding point Pa of the relatively thick workpiece $W_1$ bigger than a nugget Nb at the welding point Pb of the relatively thin workpiece $W_1'$. An internal space of the U-shaped workpiece $W_2$ is filled with a back bar electrode 62 during welding operation.

Figure 11:
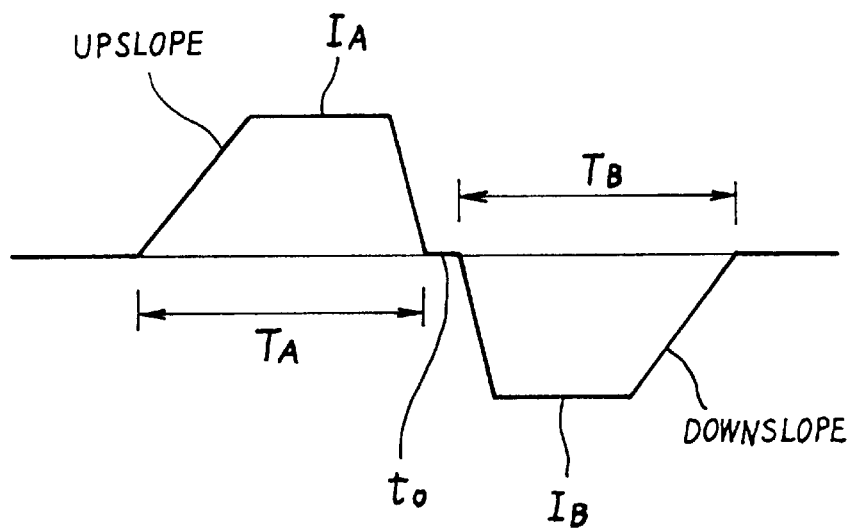
FIG. 11 is a schematic diagram showing a welding current waveform setting in the resistance welding machine of the embodiment.

FIG. 11 illustrates setting a welding current $I_2$ waveform into the control 56 from the input unit 60. In this example, the waveform of the welding current in the first half Ta of the weld time, designated by $I_A$ having an upslope, is set point symmetric with the waveform of the welding current in the second half Tb, designated by $I_B$ having a downslope with respect to a predetermined time point to.

In operation, the control 56 successively changes the preselected value [Is] with time according to the waveform $I_A$ having an upslope and the waveform $I_B$ having a downslope portion so that the welding current $I_2$ is controlled on PWM control basis so as to flow according to the setting.

For setting the welding current waveform in the second half Tb of the weld time point symmetric with that in the first half Ta, the input unit 60 may enter a welding current waveform in the first half Ta only. Then, the control 56 may automatically set the waveform of the welding current in the second half Tb point symmetric with that in the first half in Ta. Therefore, the setting can be fascilitated. In addition, the current in positive polarity has the same magnitude with that of the current in negative polarity, so that the welding transformer may be free from the polarized magnetic saturation.

In accordance with the invention, each duration of the first half Ta and second half Tb of the weld time, or the proportion thereof can desirably be chosen to adjust the size of individual nuggets Na and Nb formed at welding points Pa and Pb or the proportion thereof. This means intensionally unbalancing the duration of the first half Ta against the second half Tb. In such a case, the welding transformer 46 should be prevented from the polarized magnetic saturation. To this end, a magnetic saturation prevention technique, such as the one disclosed in the Japanese Patent laid open (Kokai) Sho64-22477, assigned to the same assignee as the present application, may be used.

In accordance with the magnetic saturation prevention technique, an intermediate portion of each primary current pulse between the leading and trailing edges is monitored. The current change rate of the intermediate portion is compared with a reference change rate. From the error of the change rate, magnetic saturation or degree thereof is detected. Then the switching operation of the switching circuit is controlled so as to cancel the error, thus adjusting the pulse width and providing effective and quick suppression of the polarized magnetic saturation. This technique can be impremented by software which may be built into the control 56.

Figure 12:
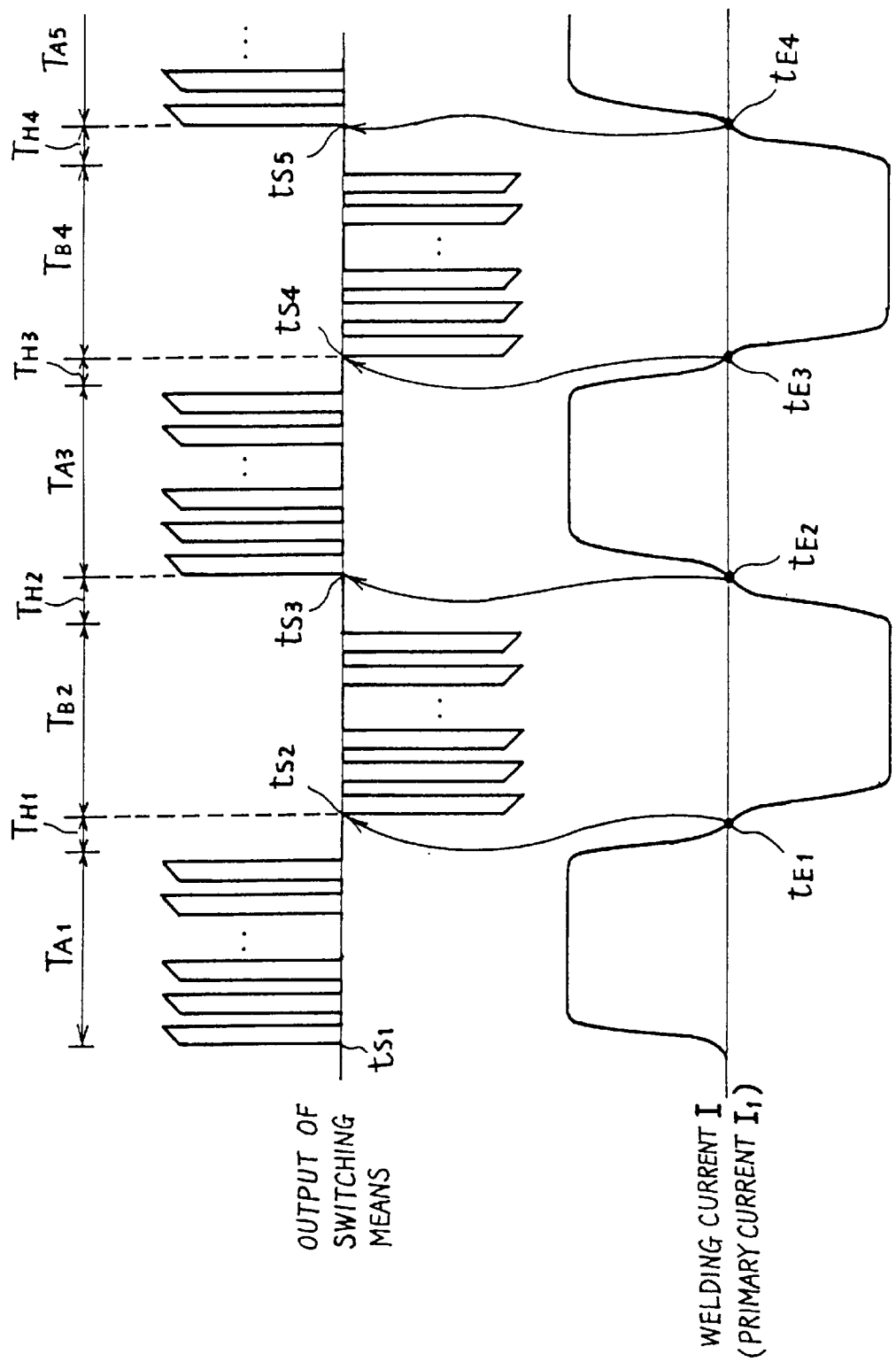
FIG. 12 is a waveform diagram showing timings for successively switching polarity of the welding current in the resistance welding machine of the embodiment.

The polarity changeover method of the invention described in conjunction with FIG. 9 is not limited to a welding operation in which the polarity changes only once between the positive and negative but can also be applied to a resistance welding operation in which the polarity changes a number of times, as shown in FIG. 12.

In the case of FIG. 12, a plurality of weld periods constitute a weld time of a single resistance welding operation. In the plurality of welding periods, odd numbered periods (Ta1, Ta3, etc.) are used for positive polarity whereas even numbered periods (Tb2, Tb4, etc.) are used for negative polarity. In the alternative, odd numbered periods may be used for negative polarity with the even numbered periods for positive polarity. In place of setting the weld time as a whole multiple of weld periods, the weld time may be set in terms of a duration of time (seconds). If desired, a variable control may be employed by stopping a predetermined (for instance, the last) weld period half way or by setting individual welding periods to different durations.

The described resistance welding apparatus employs a rectifier circuit 28 for converting a single-phase alternating current and voltage to a direct current and voltage. The rectifier circuit 28 produces from a commercial alternating voltage of 100 V to a high (for instance about 280 V) direct voltage. In the alternative, a three-phase rectifier circuit may be employed to convert a three-phase alternating voltage to a direct voltage. The configuration of the switching circuit 30 is illustrative only and can be modified in several ways. A secondary welding current $I_2$ may be detected in place of detecting a primary current $I_1$.

The description now turns to a single-phase alternating current resistance welding machine in accordance with the invention.

Figure 13:
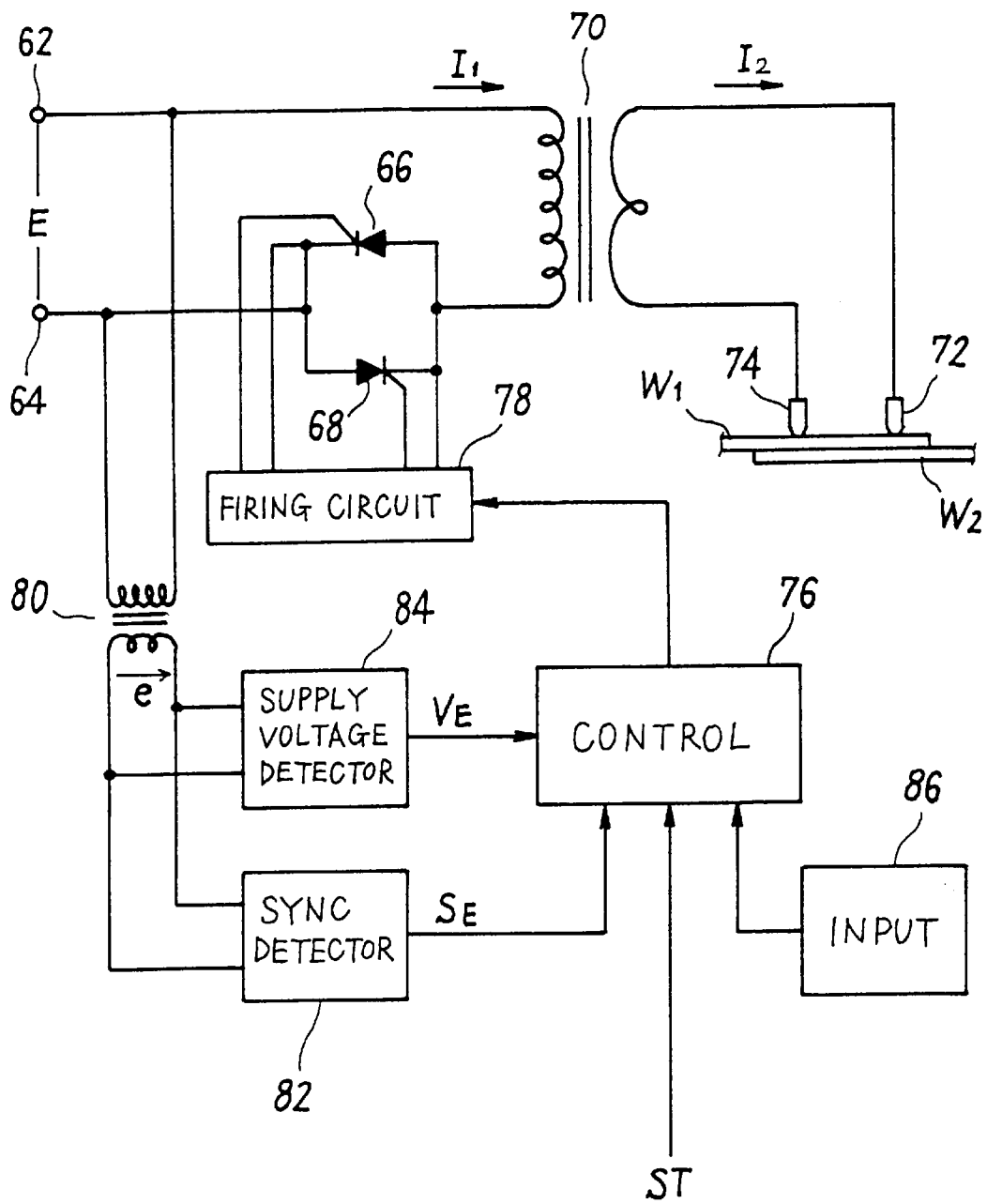
FIG. 13 is a diagram showing an arrangement of one embodiment of a single phase alternating current resistance welding machine in accordance with the invention.

FIG. 13 shows an arrangement of such a single-phase alternating current resistance welding machine. In the resistance welding machine of FIG. 13, an alternating current power supply voltage E having a commercial frequency is received by input terminals 62 and 64. The supplied voltage E is applied to a primary coil of a welding transformer 70 through a pair of thyristors 66 and 68 as contactor. An alternating induced electromotive force (secondary voltage) generated in a secondary coil of the welding transformer 70 is applied to workpieces $W_1$ and $W_2$ through a pair of welding electrodes 72 and 74, so that welding current $I_2$ flows through the secondary circuit. A primary current $I_1$ proportional to the welding current (secondary current) $I_2$ flows through the primary circuit.

The magnitude (effective value) of the welding current $I_2$ is determined by the conduction angle. Since the firing angle has a definite relationship with the conduction angle, it can also be said that the magnitude of the welding current $I_2$ is determined by the firing angle. In the illustrated resistance welding machine, a control 76 controls the firing angle (firing timing) of the thyristors 66 and 68 by way of a firing circuit 78 to control the effective value of the welding current $I_2$.

The alternating current power supply voltage E of commercial frequency received by the input terminals 62 and 64 is also applied to a primary coil of a synchronous transformer 80. A secondary coil of the transformer 80 generates a step-down alternating voltage e in phase with the power supply voltage. The voltage e is supplied to a synchronous detector circuit 82 and a supply voltage detector circuit 84. The synchronous detector circuit 82 produces from the entered alternating voltage e (50 or 60 Hz) a timing signal Se in synchronism with the alternating current power supply voltage E. The timing signal Se is fed to the control 76. The supply voltage detector circuit 84 produces from the received alternating voltage e a detected voltage signal Ve representative of the power supply voltage E. The detected voltage signal Ve is supplied to the control 76 for supply voltage compensation.

The control 76 comprises a micro computer including a CPU, a ROM (program memory), a RAM (data memory), interface circuit, etc. An input unit 86 comprises a pointing device, such as keyboard or mouse for entering and setting current value, firing angle, etc.

The present resistance welding machine performs series welding using a single cycle of the supply voltage and with a supply voltage compensation technique. The supply voltage compensation technique detects variations in the supply voltage and controls welding current so as to compensate for the variations. The supply voltage compensation technique system has a quick response and is preferred for a single-cycle welding operation.

Figure 14:
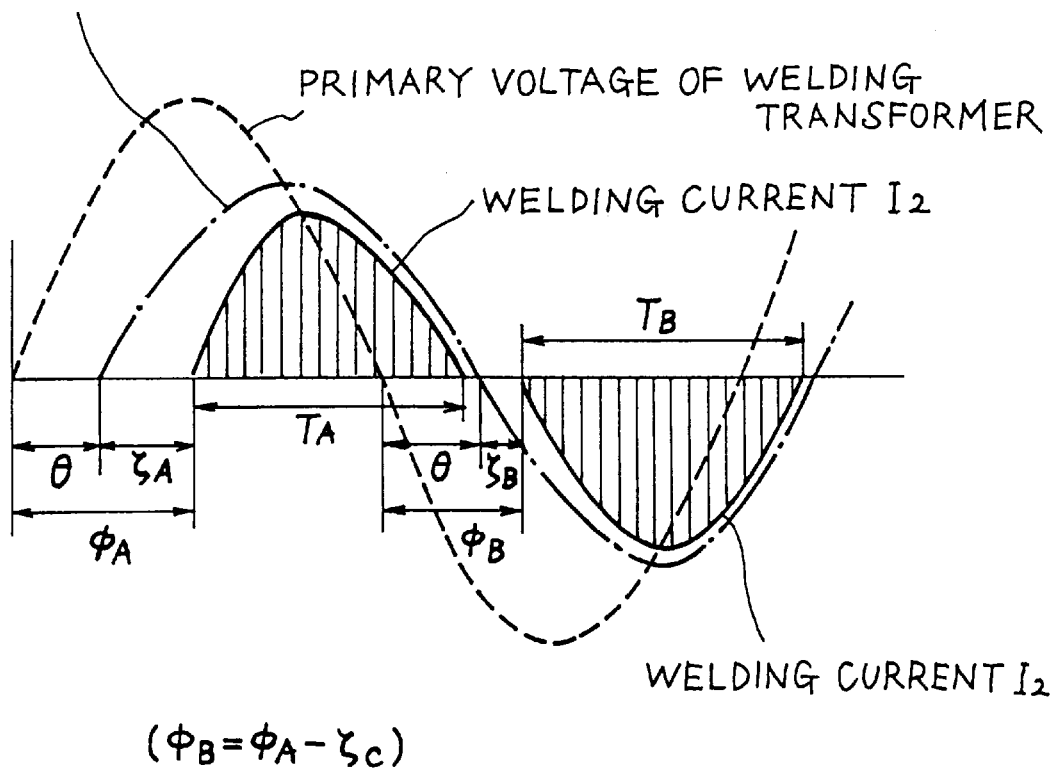
FIG. 14 is a waveform diagram showing a welding scheme of the resistance welding machine in FIG. 13.
Figure 15:
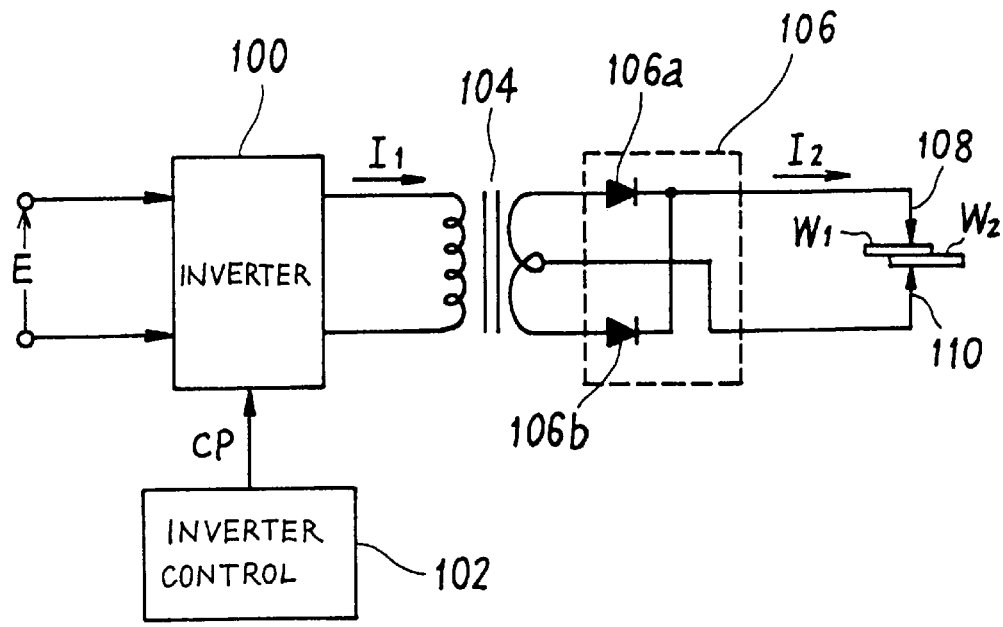
FIG. 15 is a diagram showing an arrangement of a typical prior art inverter resistance welding machine.
Figure 16:
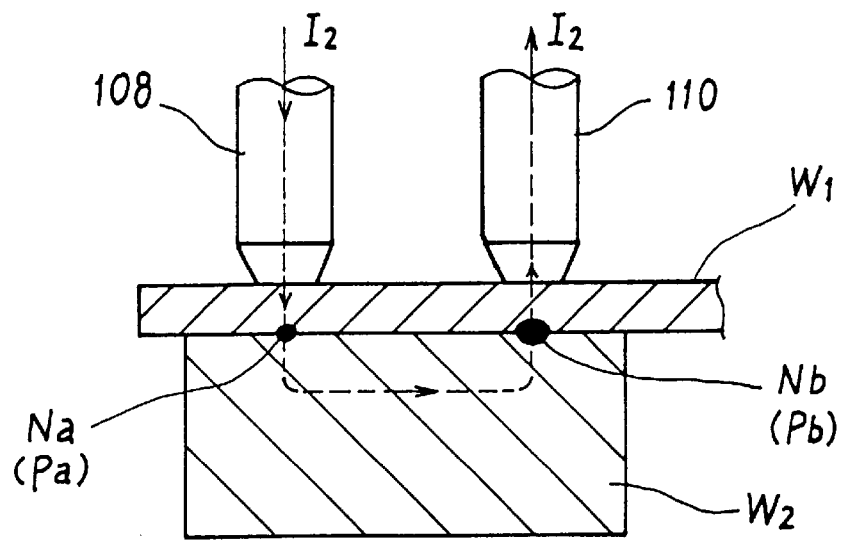
FIG. 16 is a partially sectional view of workpieces showing a problem in the prior art inverter resistance welding machine for series welding.

FIG. 14 is a timing chart of the single-cycle welding operation of the present resistance welding machine in accordance with the invention.

With an alternating current resistance welding machine of this type, the welding current I becomes a continuous sinusoidal wave, so-called full heat current waveform when the firing angle φ agrees with the power factor angle θ. When the firing angle φ lags behind the power factor angle θ by a delay ζ, a period of no voltage appears in the primary circuit of the welding transformer, so that the welding current I becomes discontinuous with a reduced peak, so-called heat-controlled current waveform. As the delay ζ of the firing angle φ further increases, the no voltage period extends, thus further reducing the welding current I. In this manner, the magnitude of the welding current I is controlled by changing the firing angle φ.

In accordance with the invention, the firing angle φB in the second half cycle is set smaller than the firing angle φa in the first half cycle by a predetermined value ζc. Specifically, the delay ζb of the firing angle φb is set smaller than the delay ζa of the firing angle φa by the predetermined value ζc. As a result, the quantity of the welding current $I_2$ having flowed through the second weld period Tb corresponding to the second half cycle becomes greater than that of the welding current $I_2$ having flowed through the first weld period Ta corresponding to the first half cycle.

In this manner, in the first weld period Ta, nuggets on workpieces $W_1$ and $W_2$ grow as in the case described in conjunction with part (A) of FIG. 3 whereas in the second word period Tb, nuggets on the workpiece $W_1$ and $W_2$ grow as in the case of part (B) of FIG. 3. At the end of the second weld period, nuggets Na and Nb have grown to essentially the same size. The difference $\zeta_c$ between the firing angles $\phi_a$ and $\phi_b$ which allows the nugget Na size to reach the nugget Nb size in the second weld period Tb depends on the welding conditions including materials and thickness of workpieces $W_1$ and $W_2$, firing angle $\phi_a$ in the first weld period Ta etc. and can empirically be determined by a welding test.

What is claimed is:

1. A method for use in controlling a resistance welding operation in which workpieces are kept in pressure contact with first and second welding electrodes at spaced contact positions and a welding current flows through the workpieces via the first and second welding electrodes to thereby weld the workpieces at first and second points corresponding to the contact positions of the first and second welding electrodes, respectively, said method comprising:

dividing a weld time of the resistance welding operation into first and second weld periods;

controlling the welding current to flow in a first polarity in the first weld period;

controlling the welding current to flow in a second polarity in the second weld period; and controlling the magnitude of the welding current during the second weld period such that the magnitude of the welding current in the second weld period is greater than the magnitude of the welding current in the first weld period, or controlling the second weld period such that the second weld period is longer than the first weld period, so that nuggets at the first and second points grow to essentially the same size at the end of the second weld period.

2. The method of claim 1 wherein the magnitude of the welding current in the second weld period is greater than the magnitude of the welding current in the first weld period and the second weld period is chosen to be equal to or longer than the first weld period.

3. The method of claim 1 wherein the second weld period is longer than the first weld period and the magnitude of the welding current in the second weld period is chosen to be equal to the magnitude of the welding current in the first weld period.

4. An apparatus for controlling resistance welding, for use with workpieces to be welded, said apparatus comprising:

a rectifier circuit operable to convert an alternating current having a commercial frequency to a direct current;

a bi-directional switching circuit operable to convert the direct current from said rectifier circuit to pulses having a high frequency;

a welding transformer having a primary coil operable to receive the pulses from said switching circuit and a secondary coil operable to output pulsed voltages at a high frequency;

first and second welding electrodes connected across said secondary coil of said welding transformer operable to make pressure contact with the workpieces at spaced positions;

a weld period setting device operable to divide a weld time of a resistance welding operation into first and second weld periods and to set the second weld period to be longer than the first weld period;

a current setting device operable to set first and second current values, for the first and second weld periods, respectively, of a primary or secondary current of said welding transformer such that the second current is equal to or greater than the first current; and a switching controller operable to successively switch said switching circuit in a first polarity at a high frequency during the first weld period in such a manner that the primary or secondary current having a value almost equal to the first current value flows, and to successively switch said switching circuit in a second polarity at a high frequency during the second weld period in such a manner that the primary or secondary current having a value almost equal to the second current value flows, so that nuggets at the spaced positions grow to essentially the same size at the end of the second weld period.

5. The apparatus of claim 4 for use with a single phase alternating current power supply having a commercial frequency, wherein said switching circuit includes first and second input terminals, and said rectifier circuit comprises:

first and second diodes each having an anode and a cathode, said anode of said first diode and said cathode of said second diode to be electrically connected to one end of the single phase alternating current power supply having a commercial frequency;

a first capacitor having a first end and a second end, wherein said first end of said first capacitor is electrically connected to said cathode of said first diode and said first input terminal of said switching circuit, and said second end of said first capacitor is to be electrically connected to the other end of the single phase alternating current power supply; and a second capacitor having a first end and a second end, wherein said first end of said second capacitor is to be electrically connected to the other end of the single phase alternating current power supply and said second end of said second capacitor is electrically connected to said anode of said second diode and said second input terminal of said switching circuit.

6. An apparatus for controlling resistance welding for use with workpieces to be welded, said apparatus comprising:

a rectifier circuit operable to convert an alternating current having a commercial frequency to a direct current;

a bi-directional switching current operable to convert the direct current from said rectifier circuit to pulses having a high frequency;

a welding transformer having a primary coil operable to receive the pulses from said switching circuit and a secondary coil operable to output pulsed voltages at a high frequency;

first and second welding electrodes connected across said secondary coil of said welding transformer operable to make pressure contact with the workpieces at spaced positions;

a weld period setting device operable to divide a weld time of a resistance welding operation into first and second weld periods and to set the second weld period to have a time duration almost equal to that of the first weld period;

a current setting device operable to set first and second current values of a primary or secondary current of said welding transformer such that the second current value is greater than the first current value; and a switching controller operable to successively switch said switching circuit in a first polarity at a high frequency during the first weld period such that the primary or secondary current having a value almost equal to the first current value flows and to successively switch said switching circuit in a second polarity at a high frequency during the second weld period such that the primary or secondary current having a value almost equal to the second current value flows so that nuggets at the spaced positions grow to essentially to the same size at the end of the second weld period.

7. The apparatus of claim 6 for use with a single phase alternating current power supply having a commercial frequency, wherein said switching circuit includes first and second input terminals, and said rectifier circuit comprises:

first and second diodes each having an anode and a cathode, said anode of said first diode and said cathode of said second diode to be electrically connected to one end of the single phase alternating current power supply having a commercial frequency;

a first capacitor having a first end and a second end, wherein said first end of said first capacitor is electrically connected to said cathode of said first diode and said first input terminal of said switching circuit, and said second end of said first capacitor is to be electrically connected to the other end of the single phase alternating current power supply; and a second capacitor having a first end and a second end, wherein said first end of said second capacitor is to be electrically connected to the other end of the single phase alternating current power supply and said second end of said second capacitor is electrically connected to said anode of said second diode and said second input terminal of said switching circuit.

8. A resistance welding apparatus for use with workpieces to be welded, said apparatus comprising:

a rectifier circuit operable to convert an alternating current having a commercial frequency to a direct current;

a bi-directional switching circuit operable to convert the direct current from said rectifier circuit to pulses having a high frequency;

a welding transformer having a primary coil operable to receive the pulses from said switching circuit and a secondary coil operable to output pulsed voltages at a high frequency;

a pair of welding electrodes connected across said secondary coil of said welding transformer operable to make pressure contact with the workpieces at spaced positions;

a switching controller operable to define a weld time of a resistance welding operation as a plurality of a weld periods, operable to successively switch said switching circuit in a first polarity at a predetermined high frequency during an odd numbered weld period in the plurality of weld periods and to successively switch said switching circuit in a second polarity at the predetermined high frequency during an even numbered weld period in the plurality of weld periods;

a current detector operable to detect a primary or secondary current of said welding transformer so as to provide a detected current signal;

a current monitor operable to monitor the primary or secondary current based on the detected current signal from said current detector immediately after each weld period so as to detect a timing when the primary or secondary current has reached a predetermined monitor value; and a weld period starter operable to start a next weld period in response to the timing detected by said current monitor.

9. An apparatus for use in controlling a resistance welding operation in which an alternating voltage at a commercial frequency is supplied to a primary coil of a welding transformer and a voltage generated in a secondary coil of the welding transformer is applied to first and second welding electrodes in pressure contact with workpieces at spaced positions, so that a welding current flows through the workpieces for resistance welding, said apparatus comprising:

a contactor operable to supply the alternating voltage at a commercial frequency to the primary coil of the welding transformer, said contactor including a pair of thyristors; and a thyristor controller operable to turn on one of said pair of thyristors at a first predetermined firing angle in a first weld period corresponding to a first half cycle of the alternating voltage and to turn on the other of said pair of thyristors at a second predetermined firing angle in a second weld period corresponding to a second half cycle of the alternating voltage, wherein the second firing angle is smaller than the first firing angle by a predetermined amount such that nuggets at the spaced positions grow to essentially the same size at the end of the second weld period.

* * * * *